Figure 1:
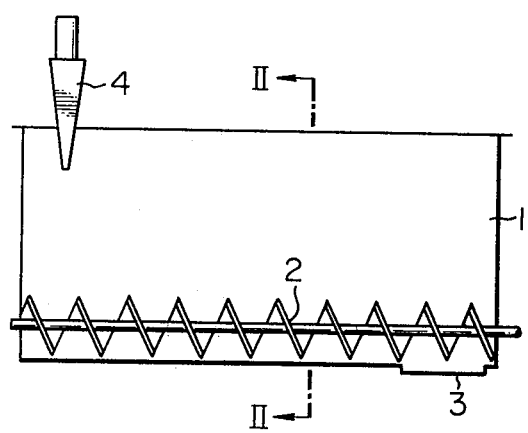

United States Patent [19]

Ohshima et al.

[11] 4,247,437
[45] Jan. 27, 1981

[54] METHOD FOR COOLING POLYMERIC HYDROGEL BLOCKS

[75] Inventors: Iwao Ohshima; Yasutaka Nakashima, both of Yokohama, Japan

[73] Assignees: Nitto Chemical Industry Co., Ltd.; Mitsubishi Rayon Co., Ltd., both of Tokyo, Japan

[21] Appl. No.: 52,662

[22] Filed: Jun. 27, 1979

[30] Foreign Application Priority Data

Jun. 29, 1978 [JP] Japan .................................. 53/78092

[51] Int. Cl.³ .......................................... C08L 33/26
[52] U.S. Cl. .............................. 260/29.6 H; 526/62; 526/88
[58] Field of Search ................... 260/29.6 H; 526/62, 526/88

[56] References Cited

U.S. PATENT DOCUMENTS

| | | | |
|---|---|---|---|
| 3,951,600 | 4/1976 | Asano et al. | 526/62 |
| 3,996,411 | 12/1976 | Ohshima et al. | 260/29.6 H |
| 4,134,871 | 1/1979 | Otani et al. | 260/29.6 H |
| 4,146,690 | 3/1979 | Tago et al. | 526/62 |

*Primary Examiner*—Maurice J. Welsh
*Attorney, Agent, or Firm*—Cushman, Darby & Cushman

[57] ABSTRACT

In cooling polymeric hydrogel blocks of about 70° to about 110° C. to less than about 70° C., said hydrogel blocks can efficiently be cooled in a short time by feeding them to a screw conveyor with a screw disposed in a horizontal or inclined trough, at least one end of which is blind and which has a discharge opening at the bottom or the side near the other end, and blowing the cooling air against the hydrogel blocks which are being pressed by the rotating screw against the blind end of the trough and lifted upward along the blind wall by the action of the rotary screw and are falling backward on the screw by gravity.

17 Claims, 5 Drawing Figures

METHOD FOR COOLING POLYMERIC HYDROGEL BLOCKS

This invention relates to a method for cooling a polymeric hydrogel. More particularly, it relates to a method for cooling to a temperature below about 70° C. almost uniformly in a short time gel blocks having a temperature of about 70° to about 110° C. and having a water content of about 50 to about 80%, said gel blocks having been obtained by polymerizing in an aqueous medium acrylamide alone or a mixture of acrylamide and other vinyl monomers. Although the size of the "gel blocks" referred to herein is not critical, the specific size for practising this invention on a commercial scale ranges from, for example, about 100 kg to several thousands kilograms when the polymerization is carried out batchwise.

Recently, water-soluble polymers comprising acrylamide units have been produced on a commercial scale and broadly used as dry- and wet-strength improvers for paper, precipitants for clarifying various kinds of waste water, so-called flocculants for use in setting of minerals or the like, pulp dispersants, and pigment-retaining agents in paper-making. Especially, the use fields of flocculants as a countermeasure against environmental pollution have been remarkably increased and include clarification of not only various kinds of industrial waste water but also household waste water and river water.

When water-soluble acrylamide polymers are used as flocculants or dispersants, their performance is said to be nearly proportional to their molecular weight and, accordingly, polymers with higher molecular weights have been generally preferred.

An aqueous solution of the water-soluble acrylamide polymer obtained by polymerization in aqueous medium increases very rapidly in viscosity. Such a tendency is further enhanced with an increase in concentration of the polymer and in some instances there is formed an uncured rubber-like tacky elastomer.

The term "acrylamide polymer" referred to herein means to include homopolymer of acrylamide and copolymers of acrylamide with other copolymerizable vinyl monomers including anionic vinyl monomers such as, for example, acrylic acid, methacrylic acid, alkali metal salts thereof and the like; cationic vinyl monomers such as, for example, dimethylaminoethyl acrylate, dimethylaminoethyl methacrylate, diethylaminoethyl acrylate, diethylaminoethyl methacrylate, dimethylaminohydroxypropyl acrylate, dimethylaminohydroxypropyl methacrylate, and dimethylaminoethylacrylamide; quaternized cationic vinyl monomers obtained by quaternizing said cationic vinyl monomers with quaternizing agents such as alkyl halides or dialkyl sulfates into quaternary ammonium salts; and nonionic monomers such as acrylonitrile, methacrylonitrile, methyl acrylate, ethyl acrylate, methacrylamide and the like.

Polymerization of these monomers is carried out at a monomer concentration in the range of about 20 to about 50%, preferably about 20 to about 35%. However, since the rigidity of the gel varies according to the type and molecular weight of monomer, said range does not mean a critical range in the strict sense.

The acrylamide polymer suitable for the aforementioned uses has generally a molecular weight as high as 3,000,000 or more. If the initial monomer concentration is about 20 to about 50%, a water-containing polymer formed at the termination of polymerization can no more be handled as a liquid, and it becomes very difficult to remove efficiently the heat evolved simultaneously with the progress of polymerization by agitating the reaction mixture in a jacketed reactor.

In order to avoid such difficulties in the polymerization system caused by the ineffective and non-uniform removal of the heat of polymerization, an adiabatic polymerization process has been proposed in U.S. Pat. No. 3,996,411. For instance, when homopolymerization of acrylamide is carried out by this process at an initial polymerization temperature of 30° C. and an initial monomer concentration of 20% or 25% by weight, the polymer temperature at the end of polymerization will become as high as about 90° C. or about 105° C., respectively.

It has been known that when the polymer temperature at the end of polymerization becomes as high as that mentioned above, secondary hydrolysis of the acrylamide polymer takes place and the polymerization product becomes unsuitable for a certain use. Particularly, for use in the flocculation treatment of suspended matters in the waste water from paper-making, unhydrolyzed polyacrylamide of a high molecular weight is required. In obtaining such a polyacrylamide by adiabatic polymerization in an aqueous medium at a monomer concentration of about 20% by weight or more, it is necessary to quench the polymer when the temperature of polymerization system has reached the maximum. To achieve the purpose, a method has been disclosed in Japanese Pat. No. 47,512/77, which comprises immersing the gel blocks in a cooling medium such as, for example, ice water. This method cannot be said to be always adequate in cooling commercially and economically a large quantity of large size gel blocks. Particularly when the polymer is soluble in water, the use of ice water is undesirable because of a loss due to dissolution of the polymer. Also, in the case of preparing a cationic acrylamide copolymer by copolymerizing in an aqueous medium a mixture of acrylamide and at least one aforementioned cationic monomer, the polymer temperature reaches a high temperature and the maintenance of the copolymer at high temperatures for a long period of time adversely affects the polymer performance. That is, it is considered that because when the polymer is maintained at a high temperature in the presence of water, the cationic side chains and amino groups in the polymer chain are hydrolyzed into anionic side chains and groups which form ionic cross-linkages with originally existing cationic side chains in the same molecule or in other molecules, the performance of the polymer is deteriorated.

Such a change in the performance of cationic acrylamide copolymers becomes larger with an increase in the temperature of water-containing polymer and in the duration of exposure to high temperatures. From the commercial and economical points of view, a higher monomer concentration during the polymerization is desirable. However, the use of a higher monomer concentration naturally results in an elevation of the temperature at the end of polymerization.

On the other hand, in carrying out the polymerization on a commercial scale, the capacity of the polymerization vessel is usually sufficiently large for the production of several hundreds to several thousands kilograms. In order to obtain a high quality nonionic or cationic acrylamide polymer by polymerization or copolymerization in an aqueous medium at a monomer concentration of about 20 to about 50% by weight, it is necessary to cool as rapidly as possible and uniformly the polymeric hydrogel blocks (hereinafter referred to simply as gel blocks) at a high temperature after the termination of polymerization to a temperature at which the change in properties of the polymer is practically negligible.

The gel block chiefly dealt with in this invention is a raw rubber-like substance of a water content of about 80% by weight or less. It is practically impossible to cool such gel blocks with agitation by means of a customary agitator in a polymerization vessel or other vessels provided with cooling jackets. There has been known a method for cooling such gel blocks by cutting them to pieces or by extruding them from a screw extruder to be pelletized and contacting the pieces or pellets with a suitable coolant, e.g. cooling air, or a low-temperature solvent which does not dissolve the gel blocks, such as, for example, low-temperature methanol, or the like.

The extruders often used for such a purpose in industry include those used in the extrusion molding of rubber and thermoplastic resins, a meat-grinder or other equipments of analogous construction. In carrying out the cooling of gel blocks on a commercial scale, if it is intended to reduce the time required for the cooling, it becomes necessary to increase the capacity of cutter or extruder to a tremendous extent. The time required for the polymerization operation as dealt with in this invention is 1 to 6 hours. If it is intended to cool the resulting gel blocks in one hour, the capacity of the extruder or the like must be large enough to pelletize the gel blocks in a period of less than one hour, e.g. 15 minutes. If such an equipment is installed, it ceases operation for the period of time before the supply of next batch of polymerizate begins. Thus, the rate of operation of the extruder or the like is as low as 20 to 4%.

Analyzing the operation in more detail, it is seen that since as soon as the polymerization is almost completed, the hydrolysis mentioned before begins to proceed in the interior of the gel blocks, the degree of deterioration of the polymer cooled in the earlier stage of cooling operation differs naturally from that of the polymer cooled in the later stage. In order to minimize the difference, the scale of the cooling equipment including the extruder or the like must be made larger.

The present inventors have conducted extensive studies on the method for cooling effectively and uniformly the gel blocks having a high temperature of about 70° C. or more and, as a result, have found that the object can be achieved by feeding the gel blocks to a screw conveyor having at least one blind end, and, while pressing the gel blocks against the blind end by the action of screw, blowing air at room temperature or cooled below room temperature against the gel blocks at near the blind end.

An object of this invention is to provide a method for cooling effectively a great quantity of large polymeric hydrogel blocks.

Another object of this invention is to provide a commercially practicable and economical method for cooling in a short period of time polymeric hydrogel blocks while subdividing the blocks in a screw conveyor.

Other objects and advantages of this invention will become apparent from the following description.

According to this invention, there is provided a method for cooling polymeric hydrogel blocks, which comprises feeding the polymeric hydrogel blocks to a screw conveyor in which a screw is disposed in a horizontal or inclined trough, at least one end of which is blind and which has a discharge opening at the bottom or the side near the other end, and blowing cooling air against the hydrogel blocks which are being pressed against the blind end of the trough and lifted upward along the blind wall by the action of rotating screw and are falling backward on the screw by gravity.

The acrylamide polymer hydrogel is an example of the hydrogels to be treated according to this invention and other polymeric hydrogels can be treated likewise.

The acrylamide polymer hydrogel is known to be generally in the form of raw rubber and has a very strong mutual adhesiveness. According to Japanese Patent Application Kokai (Laid-open) No. 6,354/78 for example, when a granulated acrylamide-polymer hydrogel is transported on a customary screw conveyor, the granules are mutually adhered, gradually become doughy and finally agglomerate into sticky mass, i.e. gel blocks.

On the contrary, when the polymeric hydrogel is treated according to this invention, one to several large gel blocks fed to the screw conveyor are subdivided into a large number of smaller blocks (1 to 60 kg) and are cooled at the same time. The subdivision of large gel blocks into smaller ones results in an increase of the surface area of gel blocks of a given weight, which is very effective to enhance the cooling effect.

In order to obtain such an effect, it is suitable to use a screw conveyor of the single-screw type or multi-screw type, in which the screw (or screws) is disposed in a horizontal or inclined trough, at least one end of which is blind and which has a discharge opening at the bottom or the side near the other end.

As the screw of the screw conveyor used for this purpose, conventional screws may be used if they can stand the transfer and press of the gel blocks, and no further device need be applied thereto. However, as a matter of course, newly devised screws may also be used.

The trough in which the screw is to be disposed must have such a capacity that the whole of the polymeric gel withdrawn from one batch of polymerization vessel can be treated therein at one time.

Figure 2:
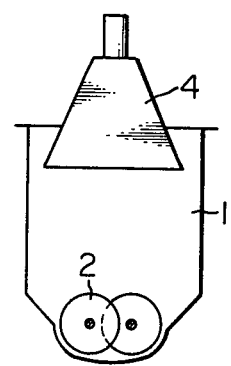

In order to increase the trough's capacity for treating a large gel block it is necessary to improve the shape of the trough relative to the screw. That is to say, as shown in FIG. 2, the trough 1 is preferably shaped so that the side walls of the trough extend upwardly divergently from points close to a horizontal plane extending through the axes of the screws 2. The angle of inclination of the divergent wall to the horizontal plane is preferably 30° to 60° or so, though it can be varied depending upon the visco-elasticity of gel. Further, the shape of the blind wall is most simply designed to be vertical to the screw axes, and in order to make the secondary rotation of gel blocks more efficient, the trough may be provided with a guide for helping the secondary rotation movement of gel blocks.

The method of cooling according to this invention is illustrated below with reference to the accompanying drawings, in which FIG. 1 is a cross-sectional view of the screw conveyor provided with a nozzle for blowing a cooling gas, FIG. 2 is a sectional view at II—II in FIG. 1, FIGS. 3a, 3b and 3c are front view, cross-sectional view and bottom view, respectively, of the nozzle in FIG. 1.

In FIGS. 1 to 3, 1 is trough, 2 screw, 3 discharge opening, 4 nozzle for blowing air, 5 air inlet to the nozzle, and 6 air delivery opening.

At first, the gel blocks are fed to the trough 1 and then the screw 2 is set in rotation. The gel blocks are subjected to the action of the rotating screw 2 so that they may move toward the blind wall, rise upward along the wall and then falls backward on the screw by gravity. Against this part of the gel blocks is blown through the air delivery nozzle 4 the air at room temperature or cooled below room temperature. It is also possible to feed the gel blocks to the trough, in which the screw has already been set in rotation. In this way, several hundreds to several thousands kilograms of gel block (not necessarily a single gel block) at about 95° can be cooled to a temperature in the range of about 60° to about 70° C. in a period of time as short as about 10 to about 30 minutes. After the cooling to a desired temperature has been completed, the direction of the screw rotation is reversed so that the gel blocks (these are no longer so large in size as are fed to the screw conveyor but are an aggregate of subdivided blocks) may be sent toward the discharge opening to be discharged.

When such a screw conveyor is used, the gel blocks are sent by the rotating screw blade toward the blind wall while being subjected to rotating action and shearing action simultaneously, whereby new surfaces are always formed. Since the air is blown against the gel blocks in such a state, the continually renewing surfaces are decreased in temperature and, hence, the cooling effect is enhanced. It is sufficient in this case to lower the temperature of the gel blocks to a level at which the rate of hydrolysis of the polymer becomes sufficiently small. Accordingly, the cooling air blown against the gel blocks may be at room temperature and not necessarily be cooled.

The screw conveyor as herein referred to may be of the single-screw type or of the multi-screw type. It is usually a single-screw type or a double-screw type, the latter being preferred.

Figure 3A:
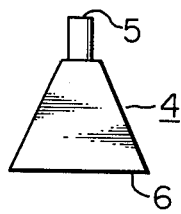
Figure 3B:
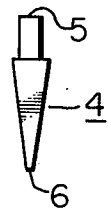
Figure 3C:

The nozzle has a function of blowing a cooling gas, usually a stream of air, against the gel blocks which are being transferred and rotated, and a typical example of its shape is as shown in FIGS. 3a to 3c. The nozzle shown in FIGS. 3a to 3c is for blowing the cooling air in the form of a flat plate against the gel block, but the air stream is not always in the form of a flat plate. An air stream in the form of a column or a row of columns may be blown. That is to say, air may be blown from one pipe or a row of pipes. The air-blowing nozzle may be fixed in the state that it is suspended from the upper part of the screw conveyor as shown in FIGS. 1 and 2, and the nozzle may be moved depending upon the size and viscoelasticity of the gel and the shape and the number of revolutions of the screw. In this case, the position of the nozzle is adjusted so that the distance between the end of the nozzle and the uppermost surface of the group of gel blocks, the position of said surface being changed with the lapse of time, may be kept at a suitable value (usually, 10 cm to scores of centimeters). Alternatively, the air-blowing nozzle may be fixed on the trough of the screw conveyor.

The flow rate of the cooling air to be blown against the gel blocks is not critical. However, as a matter of course, when the flow rate is too low, the cooling rate becomes too low. When the flowing rate is too high, the power of the blower becomes too large, and the noise of the blower becomes also too big. The flow rate of the cooling air is preferably several meters to scores of meters per sec, more preferably 10 to 30 m/sec, most preferably about 20 m/sec.

When the polymeric hydrogel to be treated according to this invention is an acrylamide polymer hydrogel, the hydrogel blocks stick to other substances or to one another because the acrylamide polymer hydrogel blocks are extremely sticky. It is apparent, therefore, that the working efficiency can be further improved by reducing or substantially eliminating the stickiness.

To achieve the above purpose, it is conceivable to incorporate polyethylene glycol into the hydrogel. Polyethylene glycol can be incorporated into the hydrogel by adding it to the polymerization system comprising monomers or by dusting the hydrogel with powdered polyethylene glycol as it is or, if necessary, spraying the hydrogel with an aqueous solution of polyethylene glycol. On contact with the hydrogel, the powdered polyethylene glycol absorbs water from the hydrogel and dissolves in the absorbed water, whereby an aqueous solution of polyethylene glycol is formed, and comes to cover the hydrogel surfaces. Therefore, the use of powdered polyethylene glycol results in essentially the same function and mechanism as in the case of the use of an aqueous solution of polyethylene glycol.

It has been surprisingly found from the experimental results that an aqueous solution of polyethylene glycol at a certain concentration (4% by weight) or more does not dissolve acrylamide polymers at all. Consequently, when the surface of hydrogel is covered with an aqueous polyethylene glycol solution, the solution serves as a barrier to confine the tackiness of hydrogel within its envelopment. The average molecular weight of polyethylene glycol suitable for this purpose is about 300 to about 1,000,000, preferably about 1,000 to about 20,000, most preferably about 3,000 to about 20,000. Although the addition of polyethylene glycol having a relatively low average molecular weight of about 300 to about 1,000 exhibits an improvement effect to some extent as compared with no addition of polyethylene glycol, the addition of polyethylene glycol having an average molecular weight of about 1,000 to about 20,000 exhibits a remarkable effect and hence is preferred. On the other hand, it has been found from the test results that the tackiness controlling effect of polyethylene glycol (polyethylene oxide) having a superhigh molecular weight of about 1,000,000 is merely comparable to that of polyethylene glycol having an average molecular weight of less than 1,000. Because of its extremely high viscosity, an aqueous solution of a superhigh molecular weight polyethylene glycol is difficult to disperse in the polymer gel. A powdered polyethylene glycol of such a high molecular weight is also difficult to disperse because of its small rate of dissolution in absorbed water. The suitable amount of polyethylene glycol added is about 0.02 to about 10%, preferably about 0.1 to about 5%, by weight based on the polymer gel.

Another group of substances usable for the same purpose as in the case of polyethylene glycol include higher fatty acids and alkali metal salts thereof (hereinafter referred to simply as higher fatty acids and salts thereof). Suitable higher fatty acids include mainly higher saturated fatty acids having 14 or more carbon atoms. These are used either alone or in admixture. There is no upper limit of the number of carbon atoms of the effective higher fatty acids and salts thereof. However, commonly usable materials are those having up to 24 carbon atoms, because of limited availability and higher cost of those having more than 24 carbon atoms.

A satisfactory result is obtained by the addition of higher fatty acids and salts thereof selected from the above-noted range in an amount of about 0.002% by weight or more, preferably about 0.02 to about 0.004% by weight, based on the weight of polymer gel. Such an amount is surprisingly small as compared with the amount (about 0.05 to about 2%) of lubricants generally added to thermoplastic resins to improve processability and to protect the products from blocking in customary plastics industry. Higher fatty acids and salts thereof used in the method of this invention are solids at ambient temperatures and are in the form of flake or powder. The powder form is preferred in order to distribute the higher fatty acids and salts thereof as uniformly as possible over the gel blocks. There are several ways of adding the higher fatty acids and salts thereof to the gel blocks. One of them is to dust the gel blocks with powdered higher fatty acids or salts thereof. Another way is to spray the gel blocks with an aqueous suspension of the higher fatty acids or salts thereof. In either case, immediately after the addition, the higher fatty acids or salts thereof are not necessarily uniformly distributed on the surface of gel blocks. However, it is presumable that owing to the kneading action of the screw conveyor, uniform distribution of the locally added higher fatty acids or salts thereof over the gel surfaces may be gradually attained, resulting in uniform prevention of the subdivided gel blocks from mutual adhesion to form aggregates.

A still another group of substances suitable for use to achieve the same purpose as mentioned above comprises compounds represented by the general formulas:

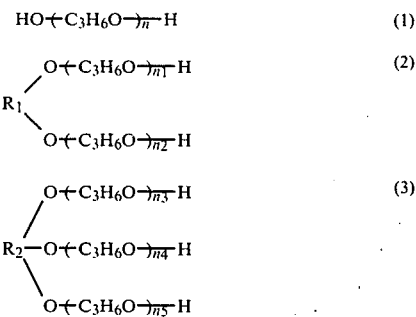

wherein $R_1$ represents a residual group formed by subtracting two hydroxyl groups from a saturated dihydric alcohol having 2 to 4 carbon atoms; $R_2$ represents a residual group formed by subtracting three hydroxyl groups from a saturated trihydric alcohol having 3 to 6 carbon atoms; and $n, n_1, n_2, n_3, n_4$ and $n_5$ represent numerical values selected so that the molecular weights of the compounds represented by the formulas (1) to (3) may become each about 500 to about 5,000. These compounds having a molecular weight up to 5,000 are liquids at room temperature and are used generally in an amount of about 0.01 to about 0.5% by weight based on the weight of the hydrogel blocks. If the amount exceeds about 0.5% by weight, the powdered polymer obtained by drying and grinding becomes undesirably sticky, while if it is used in an amount of less than about 0.01% by weight, the desirable effect of addition is difficult to obtain.

By the use of the above-mentioned substances capable of reducing the stickiness, the cooling procedure according to this invention may be carried out more efficiently.

The invention is illustrated below with reference to Examples, which are not by way of limitation but by way of illustration.

EXAMPLE 1

Nitrogen was passed through a 23% aqueous solution of acrylamide to remove the dissolved oxygen and at the same time the temperature was adjusted to 25° C. To the solution was added 0.01% by weight (based on the weight of the aqueous acrylamide solution) of 2,2'-azobis(2-amidinopropane) hydrochloride as polymerization initiator. The introduction of nitrogen was continued for a further 10 minutes to initiate the polymerization. After an induction period of about 30 minutes, the polymerization was started and continued under adiabatic conditions. After about 120 minutes, the polymerization system reached a constant temperature of 95° C., indicating completion of the polymerization. The gel block formed in the polymerization vessel was in the form of an inverted conical trapezoid, about 1.35 m in diameter at the top, about 1.2 m at the bottom, and about 1.2 m in height which weighed about 1,500 kg. The gel block was discharged from the vessel to a double-screw conveyor, as shown in FIG. 1, whereupon the block was broken into three portions (they are not equal in size or weight).

The gel blocks discharged from the vessel to the screw conveyor was sent in the left direction in FIG. 1 by rotating the screw blade at 8.6 R.P.M. Since the left end of the screw conveyor was a blind wall, the gel blocks ascended along the blind wall and the upper part fell to the right. On continued rotation of the screw, the subdivided gel blocks accumulated near the left end of the conveyor seemed at a glance to move as if they rotated clockwise on the screw. In order to cool the gel blocks, a nozzle 4 was mounted so that its air delivery orifice was positioned at a distance of about 100 to about 300 mm above the rotating gel blocks and an air stream from a blower was applied through the orifice at a speed of 20 to 22 m/second to the rotating gel blocks. The temperature of the gel blocks under cooling was measured at any point by means of ten platinum resistance thermometers inserted into stainless steel protective tubes, 5 mm in outer diameter. The operation of the screw-conveyor was, of course, stopped when measuring the temperature.

The temperature of the gel block discharged from the polymerization vessel was 95° C. After cooling for 20 minutes, the temperatures at 10 locations were within the range of 62° to 81° C., and the arithmetic mean value was 78° C. After cooling for a further 15 minutes, the mean temperature was below 70° C.

EXAMPLE 2

The procedure of Example 1 was repeated, except that a slurry obtained by suspending 60 g of powdered sodium stearate in about 0.5 liter of ion-exchanged water by means of a mixer for juice was added immediately before the addition of polymerization initiator. After cooling for 35 minutes in the same manner as in Example 1, the temperatures of the gel blocks were found to be in the range of 64° to 76° C., and the arithmetic mean value of the temperatures at 10 locations was 68° C.

With the progress of cooling, the initial gel blocks in three portions were gradually subdivided into smaller blocks. After cooling for 35 minutes, the subdivided gel blocks comprised smaller ones weighing 2 to 3 kg and middle size ones weighing 20 to 50 kg. Large gel blocks revealed a great many cleavages on the surface. It was predictable than if the cooling operation was continued further, the subdivision would proceed further, thereby forming more smaller blocks. It was observed that the surface of each subdivided gel block was of a completely amorphuse and irregular shape, resulting in a substantial increase of the total surface area as compared with that of initial gel blocks.

EXAMPLE 3

A monomer solution of the following composition was prepared in a polymerization vessel:

| 1. | Acrylamide | 238.5 kg |
|---|---|---|
| 2. | Dimethylaminoethyl methacrylate sulfate | 55.1 " |
| 3. | Dimethylaminoethyl methacrylate methyl chloride salt | 148.5 " |
| 4. | Polyethylene glycol of an average molecular weight of 6,000 | 4.5 " |
| 5. | Deionized water | 1,030 " |

A nitrogen stream was passed through the monomer solution with stirring for about 30 minutes to remove the dissolved oxygen and at the same time the temperature was adjusted to 25° C. The following chemicals, used as polymerization initiator, were added in the following order:
1. 225 g of 2,2'-azobis(2-amidinopropane) hydrochloride dissolved in 20 kg of deionized water.
2. 3.8 g of a 30% aqueous hydrogen peroxide solution dissolved in 3.4 kg of deionized water.

After addition of the above polymerization initiators, stirring and nitrogen introduction were continued for 10 minutes. Polymerization started after an induction period of about 30 minutes from the addition of polymerization initiators. After about 3 hours of adiabatic polymerization, the temperature of the polymerization system became constant at 95° C. and the polymerization was completed. Immediately after completion of the polymerization, the gel block was discharged and cooled in the same way as in Example 1. After cooling for about 50 minutes, the temperatures of the subdivided gels at 10 locations selected at random were found to be within the range of 63° to 77° C., the arithmetic mean value thereof having been 67° C.

In the subdivided gel blocks were contained some blocks bearing traces indicative of elongation, as contrasted to the subdivided gel blocks obtained in Example 2.

EXAMPLE 4

| 1. | Acrylamide | 350 kg |
|---|---|---|
| 2. | Water | 1,150 kg |
| 3. | 2,2'-Azobis(2-amidinopropane) hydrochloride | 225 g |

A polymerization system of the above composition at 28° C., which had been thoroughly treated to remove oxygen, was adiabatically polymerized. When the temperature elevated owing to heat of polymerization had reached the peak (97° C.), the polymerizate (hydrogel) was discharged. The hydrogel was dusted with 500 g of polypropylene glycol (molecular weight: about 2,000) and cooled by means of a screw conveyor in the same manner as in Example 1. After cooling for about 40 minutes, the temperature of hydrogel blocks was below 70° C. (arithmetic mean).

EXAMPLE 5

In a polymerization vessel, 262.5 kg of acrylamide, 13.8 kg of dimethylaminoethyl methacrylate and 4.5 kg of 96% sulfuric acid were dissolved in deionized water to prepare 1,200 kg of an aqueous monomer solution. After thorough removal of oxygen and adjustment of the temperature to 28° C., the monomer solution was admixed with 120 g of 2,2'-azobis(2-amidinopropane) hydrochloride and subjected to adiabatic polymerization. When the polymerization temperature reached the peak (98° C.), the polymerizate was discharged. After having been dusted with 150 g of a compound represented by the following formula having an average molecular weight of about 1,500, the hydrogel was subjected to the same cooling treatment as in Example 1:

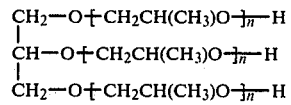

After cooling for about 45 minutes, the arithmetic mean temperature of the gel blocks became below 70° C.

REFERENCE EXAMPLE

In a 88-liter polymerization vessel, 80 kg of a monomer solution of the same composition as in Example 3 was prepared. Polymerization was carried out in the same manner and with the same initiator as in Example 3. After completion of the polymerization, the gel block at 94° C. was quickly divided into 4 portions, of which 3 portions were each wrapped up tightly in a polyethylene sheet. Each package was kept in a thermostat at 95°, 90° or 85° C. The remaining one was forcibly cooled with air to less than 70° C. in less than 15 min (this is referred to as no treatment in the following Table). Samples each weighing about 2 kg were taken out of each package after 4, 6, 8 and 12 hours. Each sample of gel block was minced to pieces, about 4 mm in size, by means of a meat grinder, then dried in a hot air drier at 60° C. for about 16 hours, and ground to prepare test samples. Each 5 g of the sample was dissolved in 500 ml of deionized water and tested for the viscosity by means of a B-type viscosimeter and for the cationity by a colloidal titration method. The results obtained were as shown in the following table:

| | | | Viscosity (cps) | Cationity millieq./g polymer |
|---|---|---|---|---|
| No treatment | | | 4850 | 2.13 |
| 85° C., | 6 | hours | 3960 | 2.00 |
| | 12 | " | 3440 | 1.95 |
| 90° C., | 6 | " | 4100 | 2.04 |
| | 12 | " | 3120 | 1.86 |
| 95° C., | 4 | " | 4080 | 1.99 |
| | 8 | " | 3160 | 1.86 |

What is claimed is:

1. A method for cooling polymeric hydrogel blocks, which comprises feeding the polymeric hydrogel blocks on a screw conveyor with a screw provided in a horizontal or inclined trough, one end of which is blind and which trough has a discharge opening at the bottom or the side near to the other end, conveying said blocks by the screw to said blind end and thereby pressing said conveyed blocks against said blind end and lifting the pressed blocks upward along the blind wall, and blowing air for cooling against the hydrogel blocks which are being lifted upward along the blind wall and are falling backward on the screw by gravity.

2. A cooling method according to claim 1, wherein the polymeric hydrogel is a hydrogel or an acrylamide polymer.

3. A cooling method according to claim 2, wherein the acrylamide polymer contains a predominant amount of the acrylamide component.

4. A cooling method according to claim 1, wherein the polymeric hydrogel is a hydrogel of a nonionic, cationic or anionic acrylamide polymer.

5. A cooling method according to claim 1, wherein the screw conveyor is a double-screw conveyor.

6. A cooling method according to claim 1, wherein the polymeric hydrogel block contains a tackiness reducing agent.

7. A cooling method according to claim 6, wherein the tackiness reducing agent comprises at least one member selected from the group consisting of polyethylene glycols having an average molecular weight of about 300 to about 1,000,000, higher fatty acids or alkali metal salts thereof, the compounds represented by the following formulas (1) to (3):

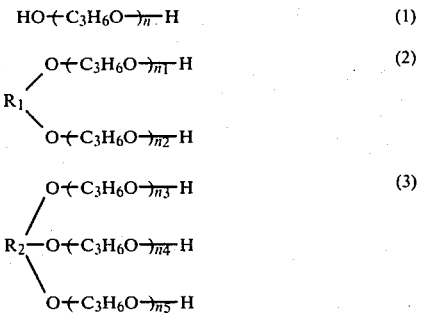

wherein $R_1$ represents a residual group formed by subtracting two hydroxyl groups from a saturated dihydric alcohol having 2 to 4 carbon atoms; $R_2$ represents a residual group formed by subtracting three hydroxyl groups from a saturated trihydric alcohol having 3 to 6 carbon atoms; and n, $n_1$, $n_2$, $n_3$, $n_4$ and $n_5$ represent numerical values selected so that the average molecular weights of the compounds represented by the formulas (1) to (3) may become about 500 to about 5,000.

8. A cooling method according to claim 1, wherein the polymeric hydrogel is a hydrogel of homopolymer of acrylamide.

9. A cooling method according to claim 8, wherein the hydrogel of homopolymer of acrylamide contains sodium stearate.

10. A cooling method according to claim 7, wherein the polymer is a copolymer of a major amount of an acrylamide and a minor amount of a dimethylaminoethyl methacrylate and contains as tackiness reducing agent a compound represented by the following formula and having an average molecular weight of 1,500:

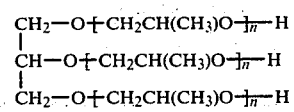

11. A cooling method according to claim 7, wherein the polyethylene glycols have a molecular weight of 1,000 to 20,000.

12. A cooling method according to claim 7, wherein the polyethylene glycols have a molecular weight of 3,000 to 20,000.

13. A cooling method according to claim 7, wherein the polyethylene glycols are used in an amount of 0.02 to 10% by weight based on the weight of the polymer gel.

14. A cooling method according to claim 7, wherein the polyethylene glycols are used in an amount of 0.1 to 5% by weight based on the weight of the polymer gel.

15. A cooling method according to claim 14 wherein the polyethylene glycols have a molecular weight of 3,000 to 20,000.

16. A cooling method according to claim 13, wherein the polyethylene glycols have a molecular weight of 1,000 to 20,000.

17. A cooling method according to claim 16, wherein the polyethylene glycols have a molecular weight of 3,000 to 20,000.

* * * * *